(12) United States Patent
Aoshima

(10) Patent No.: US 8,917,865 B2
(45) Date of Patent: Dec. 23, 2014

(54) VOLTAGE GENERATION APPARATUS AND VOLTAGE GENERATION METHOD

(75) Inventor: Takuma Aoshima, Shizuoka (JP)

(73) Assignee: NEC AccessTechnica, Ltd., Kakegawa-shi (JP)

( * ) Notice: Subject to any disclaimer, the term of this patent is extended or adjusted under 35 U.S.C. 154(b) by 17 days.

(21) Appl. No.: 13/554,682

(22) Filed: Jul. 20, 2012

(65) Prior Publication Data

US 2013/0028407 A1    Jan. 31, 2013

(30) Foreign Application Priority Data

Jul. 22, 2011  (JP) ................. 2011-161124

(51) Int. Cl.
*H04M 1/00* (2006.01)
*H02M 3/335* (2006.01)
*H02M 7/56* (2006.01)
*H02M 1/00* (2006.01)

(52) U.S. Cl.
CPC ............ *H02M 7/56* (2013.01); *H02M 3/33523* (2013.01); *H02M 2001/007* (2013.01)
USPC ..................... 379/413.01; 379/413

(58) Field of Classification Search
CPC ............ H04L 2012/2845; H04L 12/10; H04L 27/2331; H04M 19/026; H04M 3/2272; H04M 19/006; H04M 19/04; H04M 1/82; H04M 11/066; H04M 19/02
USPC ........ 379/29.03, 29.04, 179, 388.05–390.01, 379/395, 395.01, 401, 413, 413.01, 403, 379/404, 412, 418
See application file for complete search history.

(56) References Cited

U.S. PATENT DOCUMENTS

| 3,864,532 | A | * | 2/1975 | Van Der Plaats et al. | ..... 340/328 |
| 5,490,054 | A | * | 2/1996 | Hanebrink, Jr. | ........... 363/21.09 |
| 6,049,471 | A | * | 4/2000 | Korcharz et al. | ............... 363/20 |
| 7,714,546 | B2 | * | 5/2010 | Kimura et al. | ................ 323/222 |
| 2002/0191780 | A1 | * | 12/2002 | Sollins | .......................... 379/418 |

FOREIGN PATENT DOCUMENTS

| JP | 6-351050 A | 12/1994 |
| JP | 9-162975 A | 6/1997 |

* cited by examiner

*Primary Examiner* — Akelaw Teshale
(74) *Attorney, Agent, or Firm* — Sughrue Mion, PLLC

(57) ABSTRACT

A voltage generation apparatus includes a booster circuit which outputs a direct-current voltage after having performed boosting processing, the voltage value of the direct-current voltage being specified on the basis of a pulse width of a series of pulse signals inputted, a direct-current to alternating-current conversion circuit which generates a ringer voltage to be supplied to a device connectable to a telephone line by converting the direct-current voltage outputted by the booster circuit to an alternating-current voltage, and a control unit which outputs a series of pulse signals to the booster circuit. the series of pulse signals having a feeding-voltage pulse width corresponding to a target voltage value of a feeding, voltage or a ringer-voltage pulse width corresponding to a target voltage value. the feeding-voltage pulse width and the linger-voltage pulse width being pulse widths having been set in a voltage adjustment stage.

5 Claims, 7 Drawing Sheets

VOLTAGE GENERATION APPARATUS AND VOLTAGE GENERATION METHOD

This application is based upon and claims the benefit of priority from Japanese Patent Application No. 2011-161124, filed on Jul. 22, 2011, the disclosure of which is incorporated herein in its entirety by reference.

TECHNICAL FIELD

The present invention relates to a voltage generation apparatus and a voltage generation method for feeding electric power to a device which is connectable to a telephone line.

BACKGROUND ART

In general, a feeding voltage and a voltage for generating a ringer signal (hereinafter, referred to as a ringer voltage) for telephone lines is each generated on the basis of a relatively high-level direct-current voltage of 24 V or the like by means of a booster circuit. The ringer signal is an alternating-current signal of 20 Hz and 200 Vp-p (peak to peak), i.e., approximately 70 Vrms (root mean square), and is a signal which periodically repeats a time frame consisting of an on duration of 1 second and an off duration of 2 seconds. When the ringer signal has been inputted to a telephone connected to a telephone line therethrough, the telephone rings a bell or the like for signaling an incoming call.

Common apparatuses capable of connecting to at least one telephone, such as copying machines, routers and private branch exchanges (PBXs), are each configured to, in a power saving mode, supply only a low-level direct-current voltage of 3.3 V or the like, which is supplied to circuits for a control system, such as a circuit for a CPU, and suspend supply of high-level direct-current voltages. As a result, electric power consumed by these apparatuses can be reduced. Under the state where such an apparatus feeds electric power to at least one telephone connected thereto, generally, the apparatus generates a feeding voltage and a ringer voltage from a high-level direct-current voltage of −24 V or −48 V. Consequently, under the state where at least one telephone is fed with electric power from the apparatus, when the apparatus has entered the power saving mode, the at least one telephone cannot be supplied with the feeding voltage and the ringer voltage which are generated from the high-level direct-current voltage. Thus, when the apparatus is in the power saving mode, the at least one telephone is likely to be unusable. For this reason, it is desirable that such an apparatus that feeds electric power to at least one telephone connected thereto generates the feeding voltage and the ringer voltage from the low-level direct-current voltage of 3.3 V or the like.

In the case where the feeding voltage and the ringer voltage are generated from the low-level direct-current voltage of 3.3 V or the like, the boosting ratio of a booster circuit becomes large. Consequently, the feeding-voltage level and the ringer-voltage level are likely to fluctuate to a great degree because of the variation of accuracy with respect to a transformer and the like used in the booster circuit. The ringer voltage is a high-level voltage of 200 Vp-p or the like, and thus, in the case where the voltage level of the ringer signal becomes larger than a setting value because of the variation thereof, it is likely to be difficult to maintain the safety of related circuits. In contrast, in the case where the voltage level of the ringer signal becomes smaller than the setting value, sometimes, there occur inconvenient situations, such as a situation in which a bell for signaling an incoming call included in each of the at least one telephone does not ring even though supplied with a ringer signal, so that it is likely to be difficult for the at least one telephone to operate normally.

Meanwhile, there exists a circuit for adjusting a feeding-voltage level and a ringer-voltage level in such a way that a voltage signal obtained by switching an output voltage outputted by a direct-current power source is boosted by a booster/rectifier circuit; an output voltage outputted by the booster/rectifier circuit is monitored; and the feeding-voltage level and the ringer-voltage level are adjusted while changing the timing of the switching operation on the basis of the monitor result (for example, refer to Japanese Unexamined Patent Application Publication No. 6-351050). Further, there exists a circuit for preventing a rush current which arises when a ringer signal transits from an ON state (a ringing transmission state) to an OFF state (a silence transmission state), and which arises when the ringer signal transits from the silence transmission state to the ringing transmission state (for example, refer to Japanese Unexamined Patent Application Publication No. 9-162975).

SUMMARY

An exemplary object of the invention is to provide a voltage generation apparatus and a voltage generation method which make it possible to, when generating a feeding voltage and a ringer voltage from a low-level voltage, generate the feeding voltage and the ringer voltage with accuracy.

A voltage generation apparatus according to an exemplary aspect of the invention includes a booster circuit which outputs a direct-current voltage after having performed boosting processing, the voltage value of the direct-current voltage being specified on the basis of a pulse width of a series of pulse signals inputted thereto, a direct-current to alternating-current conversion circuit which generates a ringer voltage to be supplied to a device connectable to a telephone line by converting the direct-current voltage outputted by the booster circuit to an alternating-current voltage, and a control unit which outputs a series of pulse signals to the booster circuit, the series of pulse signals having a feeding-voltage pulse width corresponding to a target voltage value of a feeding voltage or a ringer-voltage pulse width corresponding to a target voltage value of the ringer voltage, the feeding-voltage pulse width and the ringer-voltage pulse width being pulse widths having been set in a voltage adjustment stage.

A voltage generation method according to an exemplary aspect of the invention includes the steps of outputting, in a voltage adjustment stage, a series of pulse signals, which have a pulse width corresponding to a voltage value higher than a target voltage value of a feeding voltage, to a booster circuit which boosts a direct-current voltage by using the series of pulse signals to generate a voltage used by a device connectable to a telephone line, storing, in the voltage adjustment stage, a certain pulse width as a feeding-voltage pulse width, the certain pulse width being a pulse width which has made a voltage value of a direct-current voltage outputted by the booster circuit be equal to a voltage value corresponding to the target voltage value of the feeding voltage while repeatedly changing a current pulse width of the series of pulse signals to a different pulse width thereof which makes a current voltage value of the direct-current voltage outputted by the booster circuit be lower so that the voltage value thereof decreases to the voltage value corresponding to the target voltage value of the feeding voltage, calculating, in the voltage adjustment stage, a ringer-voltage pulse width from the feeding-voltage pulse width, and outputting, in a voltage supply stage, a series of pulse signals, which have the feeding-voltage pulse width or the ringer-voltage pulse width, to the booster circuit.

An exemplary advantage according to the invention is to, when generating a feeding voltage and a ringer voltage from a low-level voltage, generate the feeding voltage and the ringer voltage with accuracy.

BRIEF DESCRIPTION OF THE DRAWINGS

Exemplary features and advantages of the present invention will become apparent from the following detailed description when taken with the accompanying drawings in which.

EXEMPLARY EMBODIMENT

First Embodiment

Hereinafter, a first embodiment according to the present invention will be described with reference to the drawings.

Figure 1:
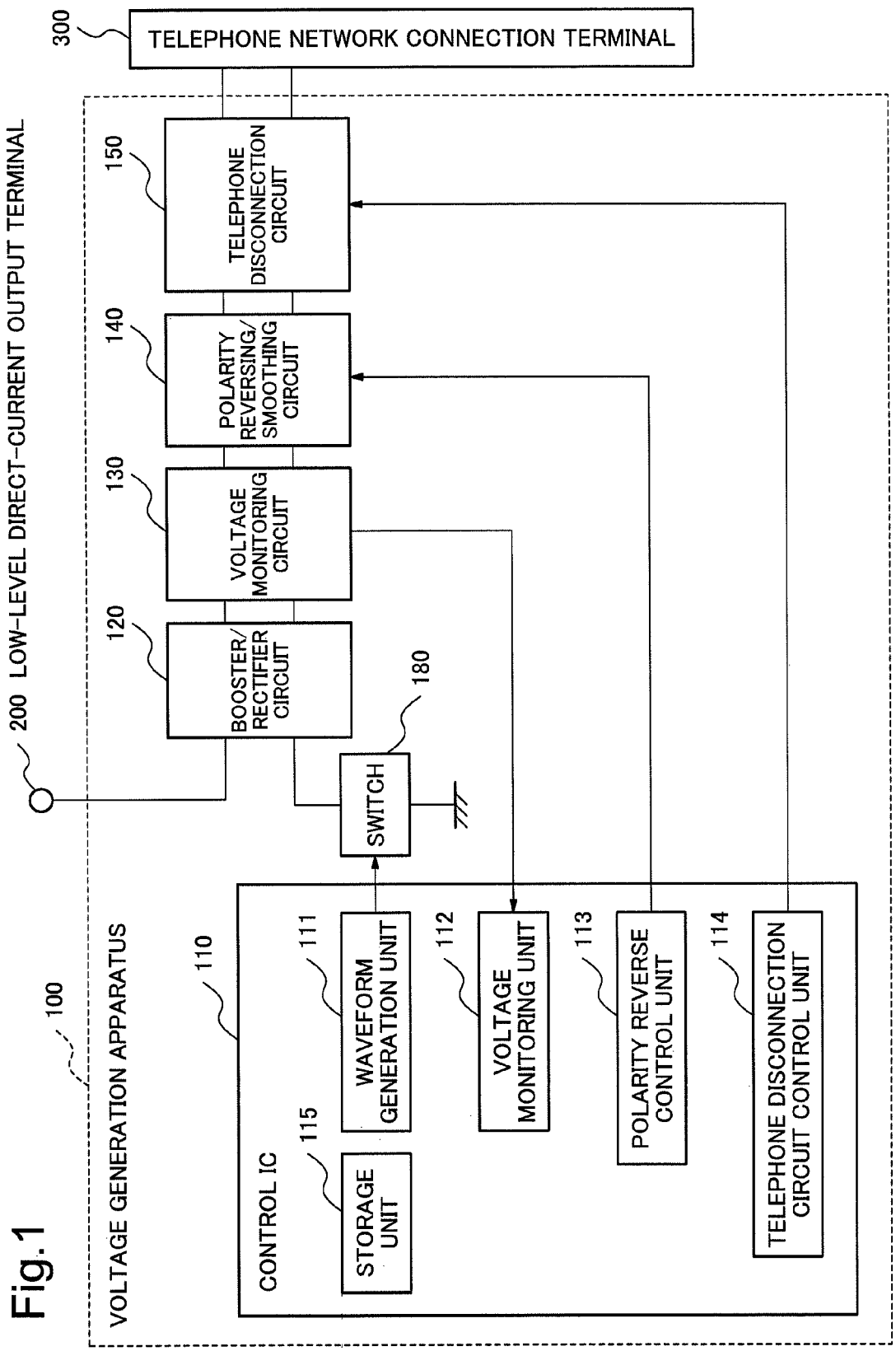
FIG. 1 is an explanatory diagram illustrating an example of a configuration of a voltage generation apparatus according to the present invention.

FIG. 1 is an explanatory diagram illustrating an example of a configuration of a voltage generation apparatus according to the present invention.

As shown in FIG. 1, a voltage generation apparatus 100 includes a control integrated circuit (IC) 110, a booster/rectifier circuit 120, a voltage monitoring circuit 130, a polarity reversing/smoothing circuit 140, a telephone disconnection circuit 150 and a switch 180. The switch 180 is constituted by, for example, a transistor. Further, the voltage generation apparatus 100 is connected to a telephone network connection terminal 300 via the telephone disconnection circuit 150.

The control IC 110 includes a waveform generation unit 111, a voltage monitoring unit 112, a polarity reverse control unit 113, a telephone disconnection circuit control unit 114 and a storage unit 115. In addition, the waveform generation unit 111, the voltage monitoring unit 112, the polarity reverse control unit 113, the telephone disconnection circuit control unit 114 and the storage unit 115 may not be integrated in one IC, but each thereof may be contained in a separate IC.

The waveform generation unit 111 inputs a series of pulse signals having an adjustable pulse width (i.e., PWM signals, and this "PWM" is the abbreviation of "pulse width modulation") to the switch 180 to turn on or turn off the switch 180.

The waveform generation unit 111 specifies the pulse width of the series of pulse signals. Here, the pulse width corresponds to the length of a period of time, during which the switch 180 is continuously turned on, within one cycle of the series of pulse signals.

The voltage monitoring unit 112 monitors voltage values inputted from the voltage monitoring circuit 130.

The polarity reverse control unit 113 performs control of a polarity reversing circuit of the polarity reversing/smoothing circuit 140.

The telephone disconnection circuit control unit 114 performs control of the telephone disconnection circuit 150.

The storage unit 115 is a storage medium for storing data therein.

The booster/rectifier circuit 120 includes a booster circuit and a rectifier circuit. The booster/rectifier circuit 120 is connected to a low-level direct-current voltage output terminal 200 through which a direct-current voltage of 3.3 V or 5 V is supplied to itself. The booster/rectifier circuit 120 boosts and rectifies the direct-current voltage which is supplied to itself through the low-level direct-current voltage output terminal 200, and outputs the resultant voltage.

The voltage monitoring circuit 130 divides the output voltage outputted by the booster/rectifier circuit 120 to decrease the voltage value outputted thereby to a voltage value which can be monitored by the voltage monitoring unit 112. Further, the voltage monitoring circuit 130 detects the on-hook operation and the off-hook operation of the telephone network connection terminal 300 from the changes of the monitored voltage value.

The polarity reversing/smoothing circuit 140 includes a polarity reversing circuit and a smoothing circuit. After having reversed the polarity of the output voltage outputted by the booster/rectifier circuit 120 by using the polarity reversing circuit, the polarity reversing/smoothing circuit 140 cuts off high frequency components of the resultant voltage by using the smoothing circuit. In addition, processing may be performed such that, after having cut off high frequency components of the output voltage outputted by the booster/rectifier circuit 120 by using the smoothing circuit, the polarity of the resultant voltage is reversed by using the polarity reversing circuit.

The telephone disconnection circuit 150 performs a connection or a disconnection between the voltage generation apparatus 100 and the telephone network connection terminal 300 in accordance with a control signal from the telephone disconnection circuit control unit 114. Under the state where the voltage generation apparatus 100 is connected to the telephone network connection terminal 300, the output voltage outputted by the polarity reversing/smoothing circuit 140 is inputted to the telephone network connection terminal 300 via the telephone disconnection circuit 150.

Next, operations of this embodiment will be described.

Figure 2:
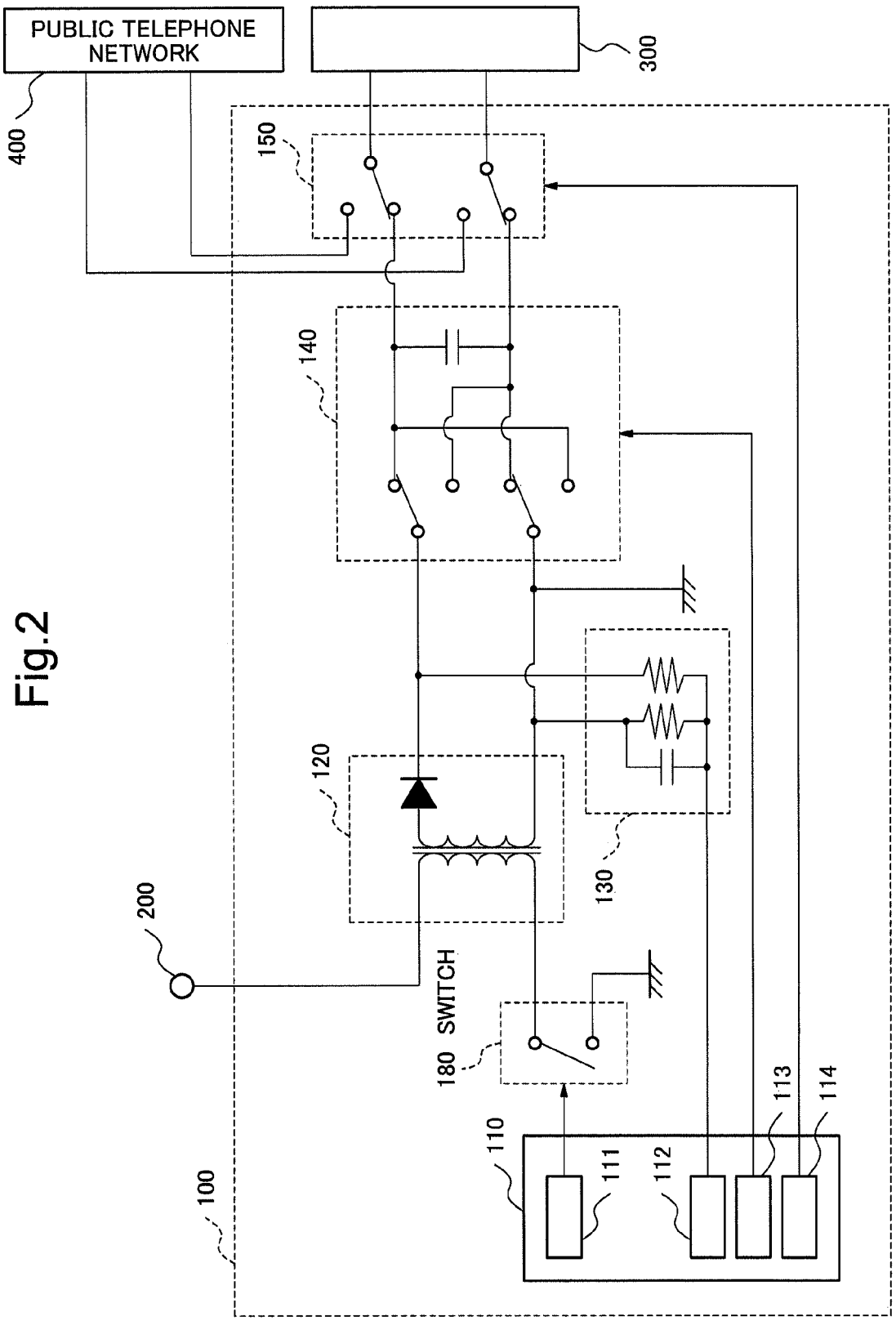
FIG. 2 is an explanatory diagram illustrating a configuration of a first embodiment of a voltage generation apparatus according to the present invention.

FIG. 2 is an explanatory diagram illustrating a configuration of a first embodiment of a voltage generation apparatus according to the present invention.

The waveform generation unit 111 of the control IC 110 inputs a series of pulse signals to the switch 180. A direct current inputted from the low-level direct-current voltage output terminal 200 to the booster/rectifier circuit 120 is switched in synchronization with turn-on and turn-off operations of the switch 180 which are caused by the series of pulse signals. In addition, in the example shown in FIG. 2, the switch 180 is installed outside the booster/rectifier circuit 120, but may be included inside the control IC 110 or the booster/rectifier circuit 120.

The booster/rectifier circuit 120 has a booster circuit including a transformer, and a rectifier circuit including a diode. The direct current inputted from the low-level direct-current voltage output terminal 200 is switched by the switch 180, and thereby, a direct-current voltage supplied from the low-level direct-current voltage output terminal 200 is boosted and rectified by the booster/rectifier circuit 120. In addition, in the example shown in FIG. 2, a circuit for a half-wave rectification is illustrated, but a different method may be employed as the rectification method.

The voltage monitoring circuit 130 performs a voltage division process using resistors and a smoothing process using a capacitor on the output voltage outputted by the booster/rectifier circuit 120 so that the output voltage outputted by the booster/rectifier circuit 120 becomes a voltage which can be monitored by the voltage monitoring unit 112. The voltage monitoring unit 112 monitors the voltage value inputted from the voltage monitoring circuit 130.

The polarity reversing/smoothing circuit 140 has a polarity reversing circuit including a plurality of relays. The polarity reverse control unit 113 performs control of the polarity reversing circuit so as to cause the polarity reversing circuit to periodically reverse the polarity of the output voltage outputted by the booster/rectifier circuit 120 to generate an alternating-current voltage of the same frequency as that of a ringer signal. In this embodiment, the frequency of the ringer signal is made 20 Hz. Further, the polarity reversing/smoothing circuit 140 has a smoothing circuit including a capacitor, and thereby, cuts off high frequency components which are included in an output voltage outputted by the polarity reversing circuit.

The telephone disconnection circuit 150 has a plurality of relays. The telephone disconnection circuit control unit 114 performs control of the relays thereof so as to cause the relays thereof to perform a connection or a disconnection between the voltage generation apparatus 100 and the telephone network connection terminal 300. When performing the disconnection between the voltage generation apparatus 100 and the telephone network connection terminal 300, the telephone disconnection circuit control unit 114 switches each of the relays thereof to the side of a public telephone network 400. The example of FIG. 2 indicates a state where the voltage generation apparatus 100 and the telephone network connection terminal 300 are connected to each other. Further, one contact of each of the relays thereof is connected to the public telephone line network 400, but may not be connected to the public telephone line network 400.

Figure 3:
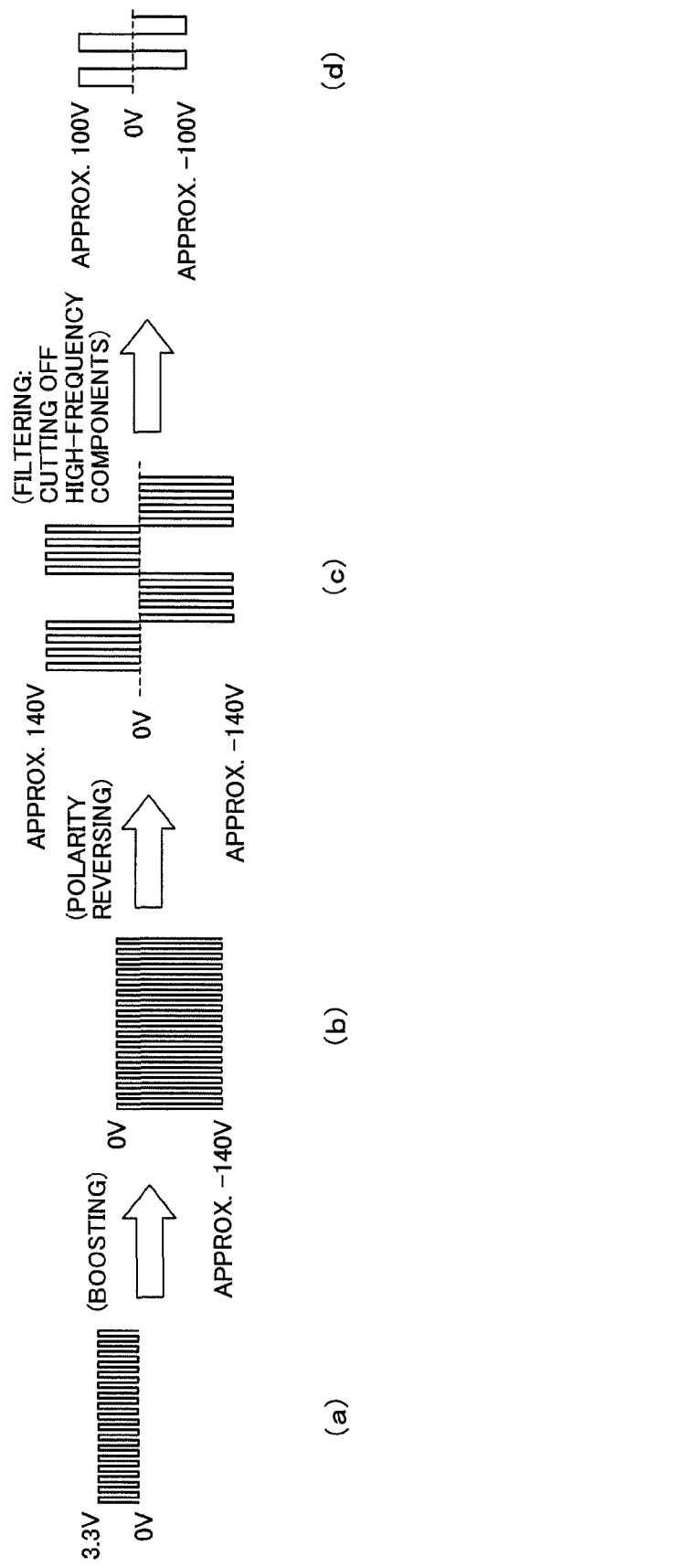
FIG. 3 is an explanatory diagram illustrating waveforms of output voltages which individual portions of a voltage generation apparatus, such as shown in FIG. 2, output when generating a ringer voltage.

FIG. 3 is an explanatory diagram illustrating waveforms of output voltages which the individual portions of the voltage generation apparatus, such as shown in FIG. 2, output when generating a ringer voltage.

In FIG. 3, a portion (a) illustrates the waveform of a voltage inputted to the booster/rectifier circuit 120. The pulse width of the pulse signals during generation of a ringer voltage is set to a value resulting from multiplying a pulse width thereof during generation of a feeding voltage by a predetermined coefficient.

In FIG. 3, a portion (b) illustrates the waveform of an output voltage outputted by the booster/rectifier circuit 120.

In FIG. 3, a portion (c) illustrates the waveform of an output voltage outputted by the polarity reversing circuit of the polarity reversing/smoothing circuit 140. The polarity of the output voltage is reversed such that the frequency of the output voltage is equal to 20 Hz (the frequency of the ringer signal).

In FIG. 3, a portion (d) illustrates the waveform of an output voltage outputted by the smoothing circuit 140. The voltage inputted from the polarity reversing circuit is smoothed, so that a ringer voltage of 200 Vp-p is generated. In addition, in the portion (d), a square wave having a voltage value of 200 Vp-p is illustrated, but the voltage value may be a value other than the value of 200 Vp-p, provided that the voltage value can generate the ringer signal.

Figure 4:
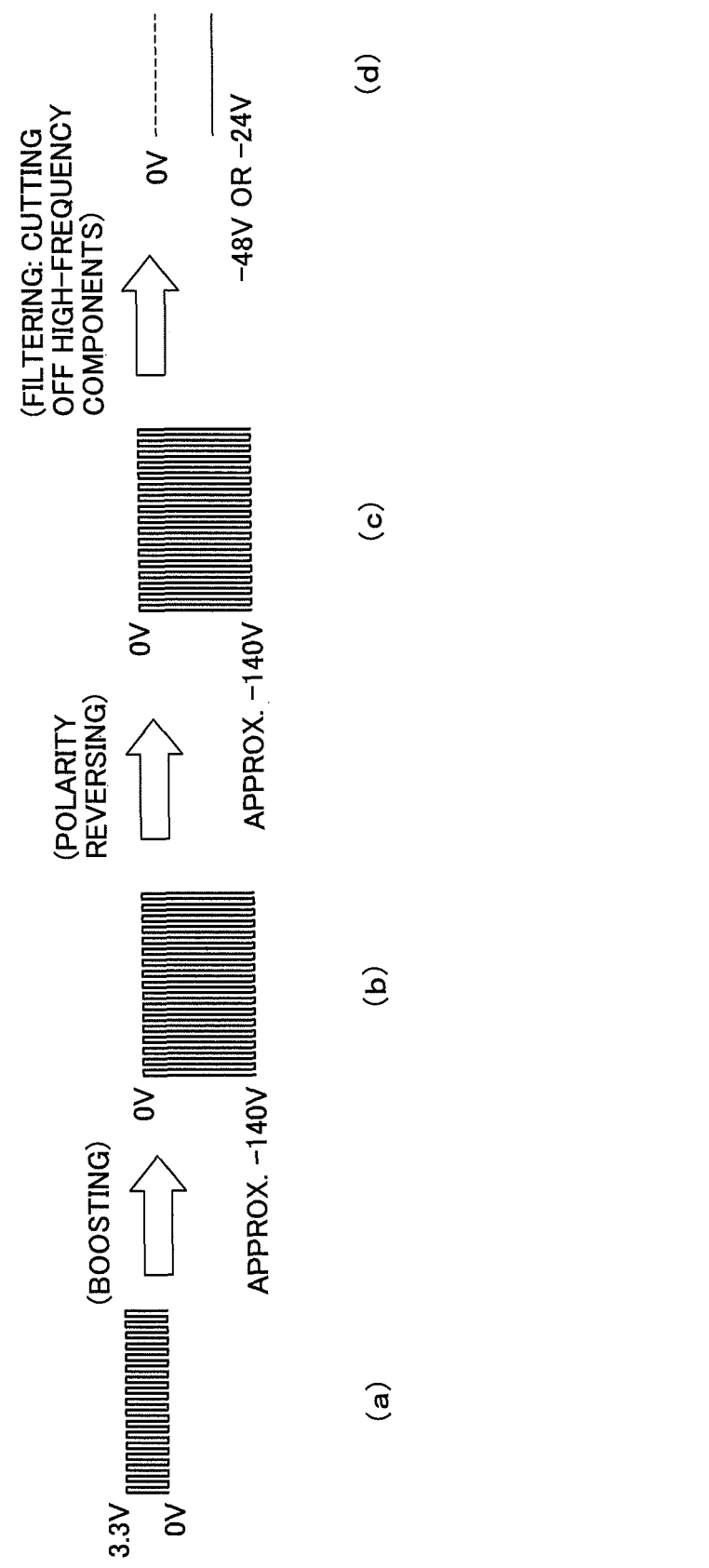
FIG. 4 is an explanatory diagram illustrating waveforms of output voltages which individual portions of a voltage generation apparatus, such as shown in FIG. 2, output when generating a feeding voltage.

FIG. 4 is an explanatory diagram illustrating waveforms of output voltages which the individual portions of the voltage generation apparatus, such as shown in FIG. 2, output when generating a feeding voltage.

In FIG. 4, a portion (a) illustrates the waveform of a voltage inputted to the booster/rectifier circuit 120. The pulse width of the pulse signals during generation of a feeding voltage is set such that an input voltage inputted to the telephone network connection terminal 300 becomes a feeding voltage.

In FIG. 4, a portion (b) illustrates the waveform of an output voltage outputted by the booster/rectifier circuit 120. The boosting ratio of the booster/rectifier circuit 120 is the same as the boosting ratio thereof during generation of the ringer voltage.

In FIG. 4, a portion (c) illustrates the waveform of an output voltage outputted by the polarity reversing circuit of the polarity reversing/smoothing circuit 140. When generating the feeding voltage, the polarity reverse control unit 113 stops control of the polarity reversing circuit of the polarity reversing/smoothing circuit 140, so that the polarity reversing is not performed. In this case, the polarity of the output voltage is not reversed, and thus, in FIG. 4, the portions (b) and (c) illustrate the same voltage waveform.

In FIG. 4, a portion (d) illustrates the waveform of an output voltage outputted by the smoothing circuit 140.

Next, operations of this embodiment will be described with reference to FIGS. 2 and 5.

Figure 5:
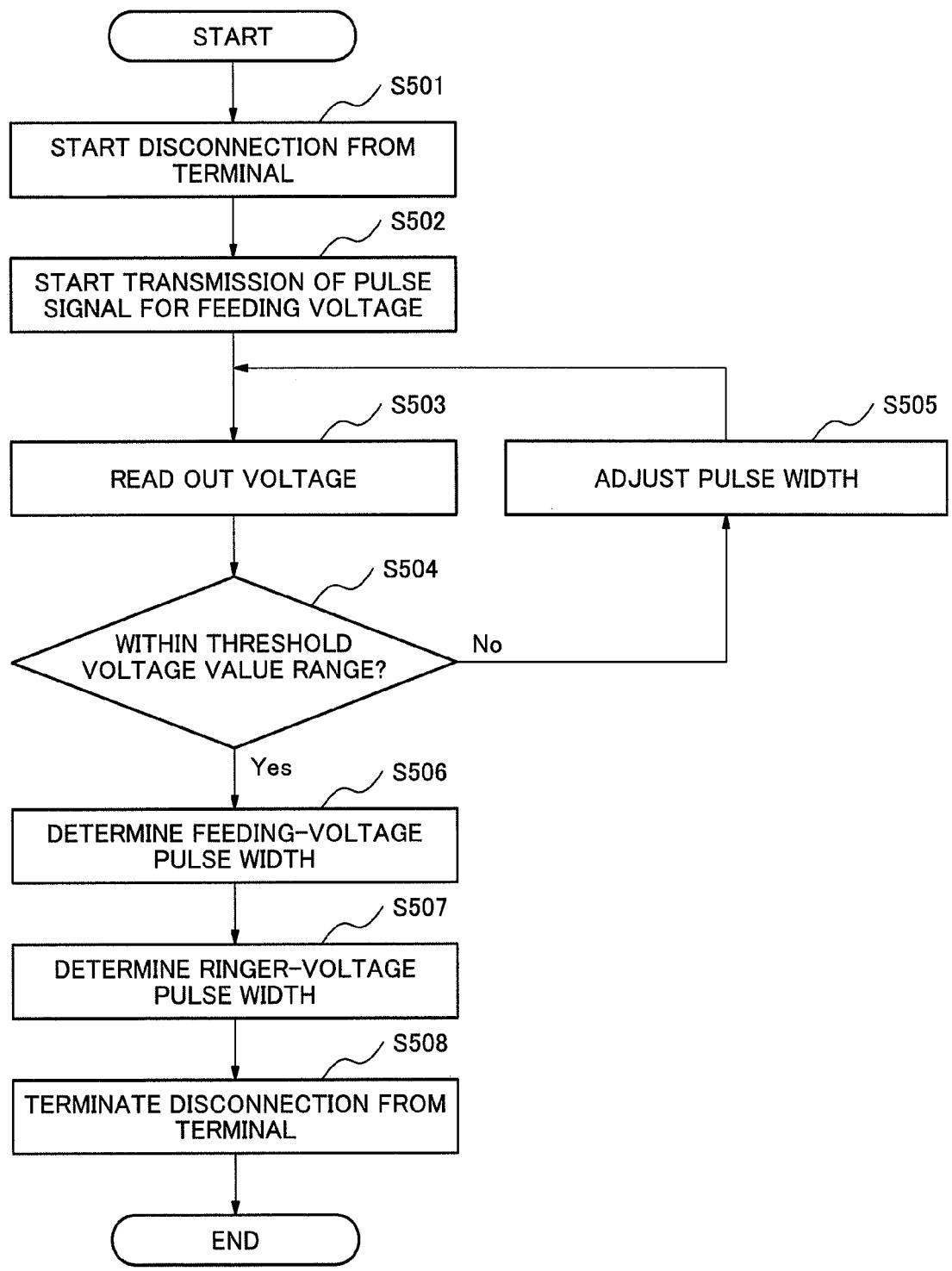
FIG. 5 is a flowchart illustrating operations of voltage adjustment control performed by a control IC, according to a first embodiment of the present invention.

FIG. 5 is a flowchart illustrating operations of voltage adjustment control performed by the control IC, according to the first embodiment.

Immediately after the control IC 110 has been powered on, the telephone disconnection circuit control unit 114 switches the relays of the telephone disconnection circuit 150 to the public telephone network 400 side. Further, the telephone disconnection circuit control unit 114 disconnects the voltage generation apparatus 100 from the telephone network connection terminal 300 (step S501).

The waveform generation unit 111 starts a transmission of a series of pulse signals for a feeding voltage whose voltage level is lower than that of a ringer voltage (step S502). The pulse width of the pulse signals at the time of starting the transmission of the series of pulse signals (hereinafter, referred to as an adjustment start pulse width) is determined in the light of the variation of the booster circuit. Specifically, a pulse width, which is required when the boosting ratio becomes the smallest one because of the variation of the booster circuit, is set. The adjustment start pulse width is stored in the storage unit 115 in advance. Further, when starting the processing of step S502, the waveform generation unit 111 reads out the adjustment start pulse width from the storage unit 115, and makes the pulse width of the pulse signals be the read-out adjustment start pulse width.

A voltage value from the voltage monitoring circuit 130 is inputted to the voltage monitoring unit 112 of the control IC 110 (step S503). The voltage value is inputted to the voltage monitoring unit 112 a plurality of times during a predetermined period of time until the voltage value becomes stable.

If the voltage value inputted to the voltage monitoring unit 112 has reached a preset threshold value ("Yes" in step S504), the waveform generation unit 111 stores the pulse width of the pulse signals as of that point into the storage unit 115 as a feeding-voltage pulse width (step S506). If the voltage value inputted to the voltage monitoring unit 112 is larger than the preset threshold value ("No" in step S504), the waveform generation unit 111 makes a current pulse width of the pulse signals be smaller (step S505), and repeats the processing of step S503.

After having performed the processing of step S506, the waveform generation unit 111 multiplies the feeding-voltage pulse width by a preset coefficient to calculate a ringer-voltage pulse width (step S507). This coefficient may be calculated from a voltage ratio of the feeding voltage and the ringer voltage, or may be calculated by means of a different method. The waveform generation unit 111 stores the value of the ringer-voltage pulse width having been calculated in step S507 into the storage unit 115.

After having performed the processing of step S507, the telephone disconnection circuit control unit 114 switches the relays of the telephone disconnection circuit 150 to the telephone network connection terminal 300 side. Further, the telephone disconnection circuit control unit 114 terminates the disconnection of the voltage generation apparatus 100 from the telephone network connection terminal 300 (step S508). In addition, the telephone disconnection circuit control unit 114 may continue the disconnection of the voltage generation apparatus 100 from the telephone network connection terminal 300 without switching the relays of the telephone disconnection circuit 150.

After having completed the processing of step S508, the waveform generation unit 111 makes the pulse width of the pulse signals be the feeding-voltage pulse width. In the case where the voltage generation apparatus 100 is connected to the telephone network connection terminal 300, the feeding voltage is supplied to the telephone network connection terminal 300. Moreover, when the control IC 110 has detected an incoming call from a terminal device connected to the public telephone network 400 to the telephone network connection terminal 300, the waveform generation unit 111 makes the pulse width of the pulse signals be the ringer-voltage pulse width, and continues to supply the ringer voltage to the telephone network connection terminal 300 until the off-hook operation of the telephone network connection terminal 300 is detected by the voltage monitoring circuit 130.

As described above, the voltage generation apparatus 100 generates the feeding voltage and the ringer voltage on the basis of the feeding-voltage pulse width and the ringer-voltage pulse width, respectively, which have been determined by performing the voltage adjustment control immediately after the power-on of the control IC. As a result, it is unnecessary to carry out any voltage adjustment every time the feeding voltage or the ringer voltage is generated. This means that the voltage generation apparatus 100 can generate the feeding voltage and the ringer voltage with accuracy when generating the feeding voltage and the ringer voltage from a low-level voltage.

Moreover, according to this embodiment, in the voltage generation apparatus 100, one booster circuit generates the feeding voltage and the ringer voltage on the basis of a low-level direct-current voltage of 3.3 V or 5 V. As a result, it is unnecessary to separately provide a booster circuit for generating the feeding voltage and a booster circuit for generating the ringer voltage. Therefore, the circuit configuration of the voltage generation apparatus 100 becomes simple. As a result, the mounting area of the circuit can be made small, and further, the cost of the circuit can be made low.

In addition, the voltage generation apparatus 100 may perform the voltage adjustment control at any appropriate time besides immediately after the power on. For example, the voltage monitoring unit 112 may continue to monitor the voltage value even after the power on thereof. Further, in the case where the voltage value inputted to the voltage monitoring unit 112 is larger than the preset threshold value, the feeding-voltage pulse width and the ringer-voltage pulse width may be readjusted by means of the voltage adjustment control.

Moreover, in the voltage adjustment control, after having determined the feeding-voltage pulse width corresponding to a target feeding voltage whose voltage level is lower than that of a target ringer voltage, the voltage generation apparatus 100 calculates the ringer-voltage pulse width on the basis of a preset coefficient. As a result, it is possible to perform the voltage adjustment control without outputting a voltage corresponding to the ringer voltage. Further, the voltage generation apparatus 100 performs adjustment of a feeding voltage which corresponds to a pulse width for the feeding voltage in the direction which gradually makes the pulse width therefor smaller and smaller from the adjustment start pulse width. As a result, there are no cases where any excessive voltage is outputted during the voltage adjustment control.

Further, the voltage generation apparatus 100 performs voltage adjustment control while monitoring the output voltage. As a result, it is possible to perform the voltage adjustment in the light of the variation of a transformer and the like included in the booster circuit. Therefore, there are no cases where a situation, in which the voltage value of the feeding voltage and the voltage value of the ringer voltage become larger than respective set values, so that the safety of related circuits cannot be maintained, occurs, or a situation, in which the voltage value of the feeding voltage and the voltage value of the ringer voltage become smaller than respective set values, so that the telephone does not operate normally, occurs.

Further, after having been disconnected from the telephone network connection terminal 300, the voltage generation apparatus 100 performs the voltage adjustment control. As a result, the voltage generation apparatus 100 is not affected by the impedance of the telephone network connection terminal 300. Therefore, the voltage generation apparatus 100 can perform the voltage adjustment control with accuracy. Moreover, while the voltage adjustment control is performed, there are no cases where any excessive voltage is outputted to the externals of the voltage generation apparatus 100.

Furthermore, the telephone disconnection circuit 150 is constituted by the relays, and thus, it is possible to connect the telephone network connection terminal 300 to the public telephone network 400 or the like which is connected to one of contacts of each of the relays, if necessary.

Second Embodiment

Hereinafter, a second embodiment according to the present invention will be described with reference to the drawings.

Figure 6:
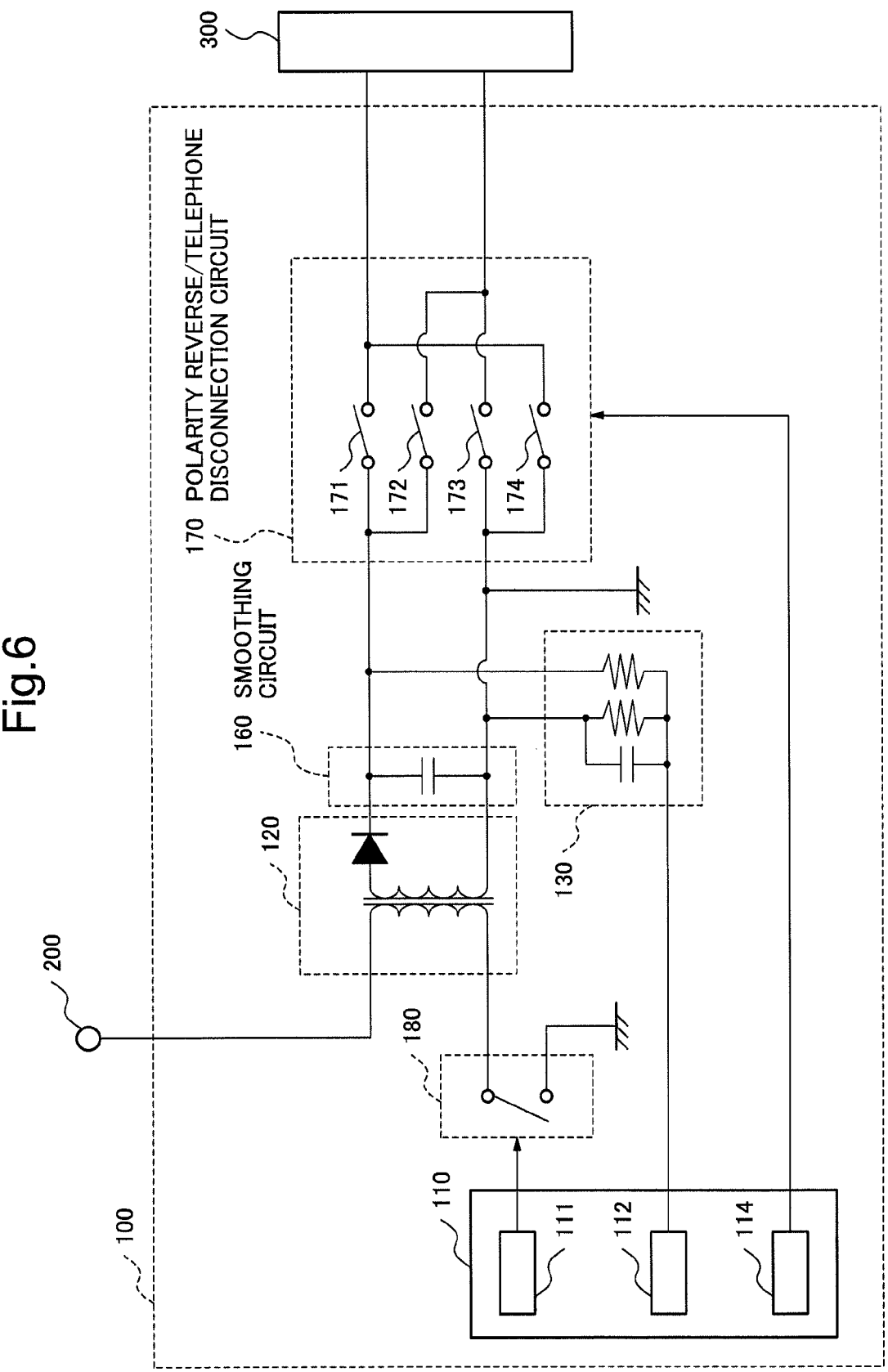
FIG. 6 is an explanatory diagram illustrating a configuration of a second embodiment of a voltage generation apparatus according to the present invention.

FIG. 6 is an explanatory diagram illustrating a configuration of a second embodiment of a voltage generation apparatus according to the present invention.

As shown in FIG. 6, the voltage generation apparatus 100 includes the control IC 110, the booster/rectifier circuit 120, the voltage monitoring circuit 130, a smoothing circuit 160, a polarity reverse/telephone disconnection circuit 170 and the switch 180.

The configurations of the control IC 110, the booster/rectifier circuit 120, the voltage monitoring circuit 130 and the switch 180 are the same as those of the first embodiment, and thus, descriptions thereof will be omitted.

The smoothing circuit 160 includes a capacitor, and cuts off high-frequency components which are included in an output voltage outputted by the booster/rectifier circuit 120.

The polarity reverse/telephone disconnection circuit 170 includes switches 171-174. The telephone disconnection circuit control unit 114 performs a polarity reverse operation and a telephone disconnection operation by switching each of the switches. When not performing the polarity reverse operation, the telephone disconnection circuit control unit 114 turns on the switches 171 and 173, and turns off the other switches. When performing the polarity reverse operation, the telephone disconnection circuit control unit 114 turns on the switches 172 and 174, and turns off the other switches. When performing the telephone disconnection operation, the telephone disconnection circuit control unit 114 turns off all the switches 171-174.

The voltage generation apparatus 100 having such a configuration as described above, which is a second embodiment of a voltage generation apparatus according to the present invention, also makes it possible to, when generating the feeding voltage and the ringer voltage from a low-level voltage, generate the feeding voltage and the ringer voltage with accuracy, just like in the case of the first embodiment.

Moreover, according to this embodiment, the polarity reverse operation and the telephone disconnection operation are performed by one circuit, and thus, the cost of the voltage generation apparatus 100 can be made low. Further, the polarity reverse control unit 113 can be omitted, and thus, the configuration of the control IC 110 can be made simple, and the processing load of the control IC 110 can be reduced.

Third Embodiment

Figure 7:
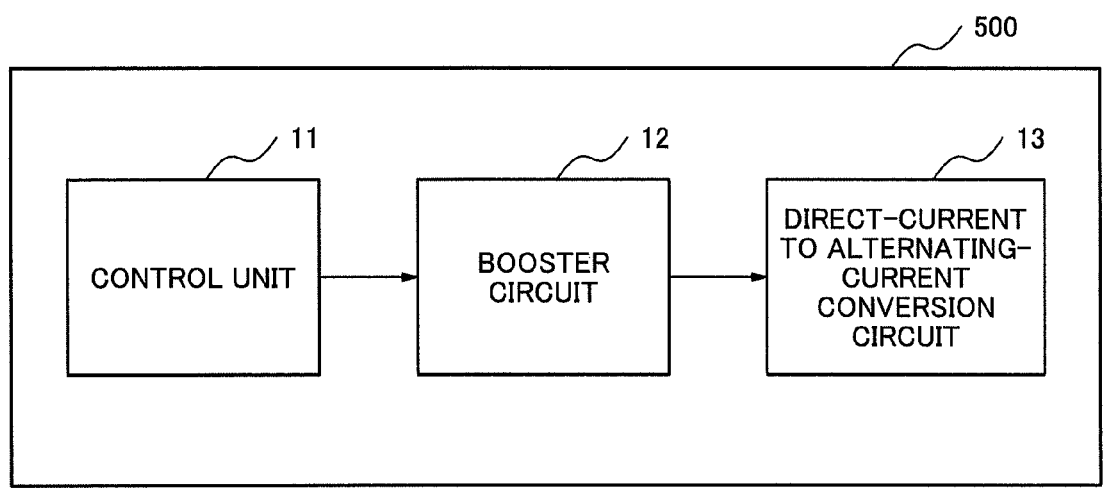
FIG. 7 is an explanatory diagram illustrating a configuration of a third embodiment of a voltage generation apparatus according to the present invention.

FIG. 7 is a diagram illustrating a configuration of a third embodiment of a voltage generation apparatus according to the present invention. A voltage generation apparatus 500 shown in FIG. 7 is a minimum configuration of the voltage generation apparatus according to the first embodiment. The voltage generation apparatus 500 generates voltages used by devices each being connectable to a telephone line. The voltage generation apparatus 500 includes a booster circuit 12, a direct-current to alternating-current conversion circuit 13 and a control unit 11. The booster circuit 12 boosts a direct-current voltage by using a series of pulse signals (this operation corresponds to that of the booster/rectifier circuit 120 shown in FIG. 1). The direct-current to alternating-current conversion circuit 13 converts the output of the booster circuit 12 to an alternating-current voltage to generate a ringer voltage to be supplied to the devices (this operation corresponds to that of the polarity reversing/smoothing circuit 140 shown in FIG. 1). The control unit 11 stores therein a feeding-voltage pulse width, which corresponds to a target feeding voltage, and which has been set in a voltage adjustment stage, as well as a ringer-voltage pulse width, which corresponds to a target ringer voltage, and which has been also set in the voltage adjustment stage. Moreover, in a voltage supply stage, the control unit 11 outputs a series of pulse signals having the feeding-voltage pulse width or the ringer-voltage pulse width to the booster circuit (these operations correspond to those of the control IC 110 shown in FIG. 1). The voltage generation apparatus 500 having such a configuration as described above makes it possible to, when generating the feeding voltage and the ringer voltage from a low-level voltage, generate the feeding voltage and the ringer voltage with accuracy by performing operations similar to those of the voltage generation apparatus 100 according to the first embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1) A voltage generation apparatus which includes a voltage monitoring circuit (corresponding to the voltage monitoring circuit 130 shown in FIG. 1) configured to output a monitor voltage value of a direct-current voltage outputted by the booster circuit 12, and which causes the control unit 11 to first output a series of pulse signals to the booster circuit 12, the series of pulse signals having a pulse width corresponding to a voltage value higher than the target voltage value of the feeding voltage, subsequently, repeatedly changes a current pulse width of the series of pulse signals to a different pulse width thereof which makes a current monitor voltage value outputted by the voltage monitoring circuit be lower so that the monitor voltage value outputted thereby decreases to a target monitor voltage value corresponding to the target voltage value of the feeding voltage, and stores therein a certain pulse width thereof, which has made the monitor voltage value outputted thereby be equal to the target monitor voltage, as a feeding-voltage pulse width.

(Supplementary Note 2) A voltage generation apparatus which causes the control unit 11 to store therein a value resulting from multiplying the feeding-voltage pulse width by a preset coefficient as a ringer-voltage pulse width.

(Supplementary Note 3) A voltage generation apparatus which includes a switch unit (corresponding to the telephone disconnecting circuit 150 shown in FIG. 1.) configured to connect or disconnect the devices in accordance with an instruction from the control unit 11, and which causes the control unit 11 to, in the voltage adjustment stage, output an instruction for disconnecting the devices to the switch unit.

(Supplementary Note 4) A voltage generation apparatus which causes the booster circuit 12 to boost a direct-current voltage of substantially 3.3 V or 5 V.

The invention claimed is:
1. A voltage generation apparatus comprising:
   a booster circuit which outputs a direct-current voltage after having performed boosting processing, the voltage value of the direct-current voltage being specified on the basis of a pulse width of a series of pulse signals inputted thereto;
   a direct-current to alternating-current conversion circuit which generates a ringer voltage to be supplied to a device connectable to a telephone line by converting the direct-current voltage output by the booster circuit to an alternating-current voltage;
   a control unit which outputs a series of pulse signals to the booster circuit, the series of pulse signals having a feeding-voltage pulse width corresponding to a target voltage value of a feeding voltage or a ringer-voltage pulse width corresponding to a target voltage value of the ringer voltage, the feeding-voltage pulse width and the ringer-voltage pulse width being pulse widths having been set and stored in a voltage adjustment stage; and
   a voltage monitoring circuit which outputs a monitor voltage value of the direct-current voltage output by the booster circuit,
   wherein in the voltage adjustment stage, the control unit first outputs a series of pulse signals to the booster cir- cuit, the series of the pulse signals having a pulse width corresponding to a voltage value higher than the target voltage value of the feeding voltage, subsequently, repeatedly changes a current pulse width of the series of pulse signals to a different pulse width thereof which makes a current monitor voltage value output by the voltage monitoring circuit be lower so that the monitor voltage value output thereby decreases to a target monitor voltage value corresponding to the target voltage value of the feeding voltage, and stores therein a certain pulse width thereof, which has made the monitor voltage value output thereby be equal to the target monitor voltage, as the feeding-voltage pulse width, and wherein the control unit stores therein a value resulting from multiplying the feeding-voltage pulse width by a voltage ratio of the feeding voltage and the ringer voltage as the ringer-voltage pulse width.

2. The voltage generation apparatus according to claim 1, further comprising a switch unit which connects or disconnects the device connectable to a telephone line in accordance with an instruction from the control unit, wherein, in the voltage adjustment stage, the control unit outputs an instruction, for disconnecting the device connectable to a telephone line, to the switch unit.

3. The voltage generation apparatus according to claim 1, wherein the booster circuit boosts a direct-current voltage of substantially 3.3 V or 5 V.

4. A voltage generation method comprising the steps of:

outputting, in a voltage adjustment stage, a series of pulse signals, which have a pulse width corresponding to a voltage value higher than a target voltage value of a feeding voltage, to a booster circuit which boosts a direct-current voltage by using the series of pulse signals to generate a voltage used by a device connectable to a telephone line;

storing, in the voltage adjustment stage, a certain pulse width as a feeding-voltage pulse width, the certain pulse width being a pulse width which has made a voltage value of a direct-current voltage output by the booster circuit be equal to a voltage value corresponding to the target voltage value of the feeding voltage while repeatedly changing a current pulse width of the series of pulse signals to a different pulse width thereof which makes a current voltage value of the direct-current voltage output by the booster circuit be lower so that the voltage value thereof decreases to the voltage value corresponding to the target voltage value of the feeding voltage;

calculating, in the voltage adjustment stage, a ringer-voltage pulse width from the feeding-voltage pulse width; and outputting, in a voltage supply stage, a series of pulse signals, which have the feeding-voltage pulse width or the ringer-voltage pulse width, to the booster circuit, wherein a value resulting from multiplying the feeding-voltage pulse width by a voltage ratio of the feeding voltage and the ringer voltage is made the ringer-voltage pulse width.

5. The voltage generation method according to claim 4 wherein, in the voltage adjustment stage, the booster circuit is disconnected from the device.

* * * * *

UNITED STATES PATENT AND TRADEMARK OFFICE
CERTIFICATE OF CORRECTION

| | |
|---|---|
| PATENT NO. | : 8,917,865 B2 |
| APPLICATION NO. | : 13/554682 |
| DATED | : December 23, 2014 |
| INVENTOR(S) | : Takuma Aoshima |

It is certified that error appears in the above-identified patent and that said Letters Patent is hereby corrected as shown below:

ON THE TITLE PAGE

ITEM 57

Column 2, Line 11: Delete "the" and insert -- The --

Column 2, Line 14: Delete "the" and insert -- The --

Column 2, Line 15: Delete "linger-voltage" and insert -- ringer-voltage --

Signed and Sealed this
First Day of December, 2015

Michelle K. Lee
*Director of the United States Patent and Trademark Office*